United States Patent
Chang (10) Patent No.: US 7,444,718 B1
(45) Date of Patent: Nov. 4, 2008

(54) RATCHET BUCKLE DEVICE

(76) Inventor: Vincent Chang, No. 15-10, Lane 142, Sec. 5, Changnan Road., Changhua 50088, TW (TW) 50088

( * ) Notice: Subject to any disclaimer, the term of this patent is extended or adjusted under 35 U.S.C. 154(b) by 0 days.

(21) Appl. No.: 11/888,457

(22) Filed: Jul. 31, 2007

(51) Int. Cl.
*B25B 25/00* (2006.01)

(52) U.S. Cl. .................................. 24/68 CD

(58) Field of Classification Search ............... 24/68 CD, 24/909, 68 R, 68 B, 68 E; 254/217, 218, 254/237, 238, 213, 223
See application file for complete search history.

(56) References Cited

U.S. PATENT DOCUMENTS

| | | | |
|---|---|---|---|
| 3,749,366 A | 7/1973 | Brucker | 254/164 |
| 4,185,360 A | 1/1980 | Prete, Jr. et al. | 24/68 CD |
| 5,205,020 A * | 4/1993 | Kamper | 24/68 CD |
| 5,271,606 A * | 12/1993 | Kamper | 254/217 |
| 5,426,826 A | 6/1995 | Takimoto | 24/68 CD |
| 5,855,045 A | 1/1999 | Miura | 24/68 CD |

FOREIGN PATENT DOCUMENTS

WO    WO 8908603 A1 *  9/1989

* cited by examiner

*Primary Examiner*—James R Brittain
(74) *Attorney, Agent, or Firm*—Charles E. Baxley (57) ABSTRACT

A ratchet buckle device includes a base having two side plates rotatably attached to a reel drum, one or more toothed discs attached to the reel drum and latched to the base with a stop, an operating arm having two legs rotatably attached to the reel drum, a catch device latching the operating arm to the toothed disc, and a latch pivotally attached to the side plates for engaging with the toothed disc, and for allowing the latch to be tilted relative to the side plates, and the ratchet buckle device includes an improved structure for allowing the ratchet buckle device to be easily operated and for allowing the belt or strap to be temporarily released and to be easily unlocked or unfastened.

4 Claims, 14 Drawing Sheets

RATCHET BUCKLE DEVICE

BACKGROUND OF THE INVENTION

1. Field of the Invention

The present invention relates to a strapping device or a ratchet buckle or tie-down or fastening device, and more particularly to a ratchet buckle device including an improved structure for allowing the ratchet buckle device to be easily operated and for allowing the belt or strap to be easily released.

2. Description of the Prior Art

Typical ratchet buckle or tie-down or fastening device or strapping devices comprise two arms pivotally mounted about a reel drum on which are mounted toothed discs which turn with the drum, the first arm includes a first catch engaged with the teeth of the disc teeth for preventing the belt or strap and the reel drum from being rotated reversely and for allowing the belt or strap to be wound onto the reel drum, and the second arm includes a second catch engaged with the teeth of the disc teeth for preventing the belt and the reel drum from being rotated reversely when the belt and the reel drum are pivoting relative to the arms.

For example, U.S. Pat. No. 3,749,366 to Srucker, and U.S. Pat. No. 4,185,360 to Prete, Jr. et al., and U.S. Pat. No. 5,426,826 to Takimoto, and U.S. Pat. No. 5,855,045 to Miura disclose four of the typical ratchet buckle devices for tightening and locking load-fastening belts each also comprising two arms pivotally mounted about a reel drum for winding or tighting the belt or strap with the reel drum by pivoting or rotating the arms relative to each other.

However, the belt or strap may only be solidly tightened onto the ratchet buckles and may only be released from the ratchet buckles after use, but may not be micro-adjusted relative to the ratchet buckles and may not be suitably released from the ratchet buckles.

The present invention has arisen to mitigate and/or obviate the afore-described disadvantages of the conventional ratchet buckle or tie-down or fastening devices or strapping devices.

SUMMARY OF THE INVENTION

The primary objective of the present invention is to provide a ratchet buckle device including an improved structure for allowing the ratchet buckle device to be easily operated and for allowing the belt or strap to be easily released.

In accordance with one aspect of the invention, there is provided a ratchet buckle device comprising a base including two side plates, the side plates each including an orifice formed in an operating end portion thereof, and each including a channel formed therein, and each including a protrusion extended into the channel of the side plate, and each including an operating segment and a release segment and an unlock segment formed in the operating end portion thereof, a reel drum rotatably engaged in the orifices of the side plates of the base for rotatably attaching the reel drum to the base, two toothed discs attached to the reel drum and rotated in concert with the reel drum, and each including a plurality of disc teeth provided thereon, a spring-biased stop slidably attached to the channels of the side plates of the base and including two limbs for detachably engaging with the disc teeth of the toothed discs, and for limiting the toothed discs and the reel drum to rotate relative to the base in an active direction and for preventing the reel drum from being rotated in a reverse direction relative to the base, the protrusions of the side plates being engageable with the stop for tilting the stop relative to the side plates of the base, and for allowing the limbs of the stop to be moved up and down relative to the side plates, a latch pivotally attached onto the side plates of the base with a shaft for allowing the latch to be tilted relative to the side plates, and the latch including two fingers for engaging with the disc teeth of the toothed discs and for limiting the toothed discs and the reel drum to rotate relative to the base in the active direction only and for preventing the reel drum from being rotated in the reverse direction relative to the base and for allowing the reel drum to rotate in the active direction relative to the side plates of the base, an operating arm including two legs rotatably attached to the reel drum, and including an opening formed in a mounting portion of each of the legs for receiving the reel drum and for attaching the legs of the operating arm to the reel drum, and the legs each including a primary cam member and a secondary cam member provided on the mounting portion of the leg of the operating arm for selectively engaging with the stop and the latch and for selectively disengaging the limbs of the stop from the disc teeth of the toothed discs and for selectively disengaging the fingers of the latch from the disc teeth of the toothed discs, and a spring-biased catch device slidably attached to the operating arm and engaged with the disc teeth of the toothed discs, for allowing the toothed discs and the reel drum to be rotated relative to the base by the operating arm in the active direction and for preventing the reel drum from being rotated in the reverse direction relative to the base by the operating arm, and the operating segments of the side plates each include an outer diameter smaller than that of the disc teeth of the toothed discs for allowing the disc teeth of the toothed discs to be extended radially and outwardly relative to the operating segment of the side plates of the base and for allowing the pawls of the catch device to be engaged with the disc teeth of the toothed discs, and the release segments of the side plates each include an outer diameter greater than that of the disc teeth of the toothed discs for allowing the disc teeth of the toothed discs to be shielded within the release segment of the side plates of the base and for preventing the pawls of the catch device from being engaged with the disc teeth of the toothed discs, and the unlock segments of the side plates each include an outer diameter greater than that of the disc teeth of the toothed discs for preventing the pawls of the catch device from being engaged with the disc teeth of the toothed discs, and the primary cam members of the legs of the operating arm are engageable with either of the stop or the latch for selectively disengaging the stop or the latch from the disc teeth of the toothed discs when the catch device is engaged with the release segment of the side plates of the base, and the primary cam members and the secondary cam members of the legs of the operating arm are engaged with the stop and the latch for disengaging the stop and the latch from the disc teeth of the toothed discs when the catch device is engaged with the unlock segment of the side plates of the base.

The latch includes two flaps extended downwardly therefrom and pivotally attached onto the side plates of the base with the pivot shaft.

The base includes a base plate provided between the side plates, and a peg extended from the base plate and having a space formed in the peg for slidably receiving a tail of the stop and for allowing the stop to be tilted relative to the side plates.

The base includes an opening formed in each of the side plates and communicating with the channel of the side plate for allowing the stop to be tilted relative to the side plates.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-4, a ratchet buckle device 1 in accordance with the present invention comprises two arms or a base 10 and an operating arm 30 to be pivotally coupled together or pivotally mounted about a reel drum 20, for example, the base 10 includes two side walls or plates 11 extended or dependent upwardly from a lateral or upper or base wall or plate 12, the side plates 11 each include an orifice 13 formed in one end or operating end portion 19 thereof (FIG. 1) for rotatably receiving the reel drum 20, the reel drum 20 includes two drum halves 21 spaced away from each other for forming or defining a strap receiving slot 22 (FIGS. 4, 5) between the two drum halves 21, and one or more (such as two) toothed discs 23 attached or mounted or secured to the reel drum 20.

For example, the toothed discs 23 each include two apertures 24 formed therein (FIG. 1) for receiving the end portions of the drum halves 21 of the reel drum 20 respectively and for allowing the toothed discs 23 to be turned or rotated in concert with the reel drum 20. The toothed discs 23 each further include a number of disc teeth 25 provided or formed thereon, and one or more (such as two) lock pins 26 are attached or engaged with the reel drum 20, such as engaged with the end portions of the reel drum 20 for engaging with the side plates 11 and/or the operating arm 30 and for anchoring or positioning the reel drum 20 to the base 10 and the operating arm 30 and for preventing the reel drum 20 from being moved laterally relative to the base 10 and the operating arm 30 and for preventing the reel drum 20 from being disengaged from the base 10 and the operating arm 30.

The base 10 includes a channel 14 formed in each of the side plates 11 for slidably attaching or receiving a spring-biased stop 40 which includes one or more (such as two) limbs 41 for engaging with the disc teeth 25 of the toothed discs 23 and for guiding or limiting the toothed discs 23 and the reel drum 20 to rotate relative to the base 10 in one or an active direction only and for preventing the reel drum 20 from being rotated in a reverse direction relative to the base 10 and thus for allowing the reel drum 20 to rotate only in the active direction relative to the base 10. The base 10 includes a peg 15 formed on the base plate 12 for engaging with a spring member 42 which may bias or force the limbs 41 of the stop 40 to engage with the disc teeth 25 of the toothed discs 23 and for guiding or limiting the toothed discs 23 and the reel drum 20 to rotate relative to the base 10, and thus for allowing the toothed discs 23 and the reel drum 20 to rotate in the active direction relative to the base 10 step by step.

The base 10 includes an enlarged opening 16 formed in each of the side plates 11, and communicating with the respective channel 14 of the side plate 11 (FIGS. 4, 5), such as communicating with the front portion of the respective channel 14 of the side plate 11, and further includes a protrusion 17 extended into the opening 16 and the channel 14 of the side plate 11 for engaging with the stop 40 and for slightly tilting the stop 40 relative to the side plates 11 of the base 10, or arranged for allowing the stop 40 to be slightly tilted relative to the side plates 11, and thus for slightly increasing the contacting or engaging time of the limbs 41 of the stop 40 with the disc teeth 25 of the toothed discs 23. The peg 15 of the base 10 includes an enlarged space 18 formed therein for slidably receiving a tail 43 of the stop 40 and also for allowing the stop 40 to be slightly tilted relative to the side plates 11.

Figure 7:
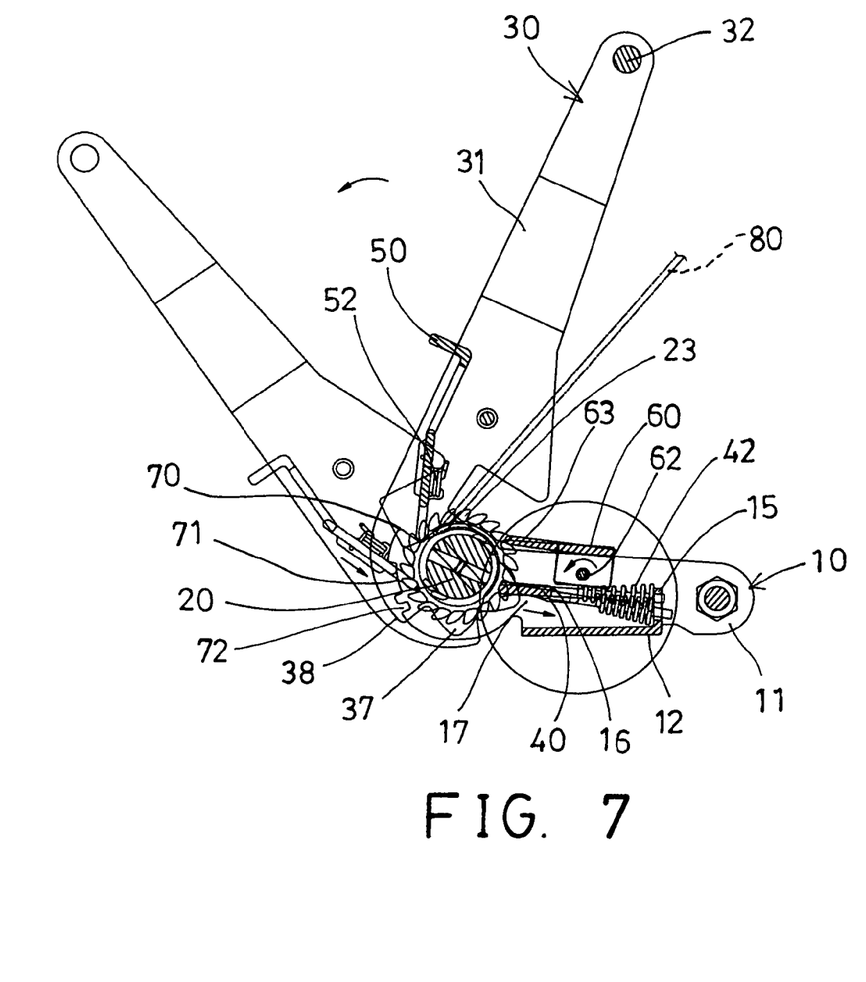
Figure 8:
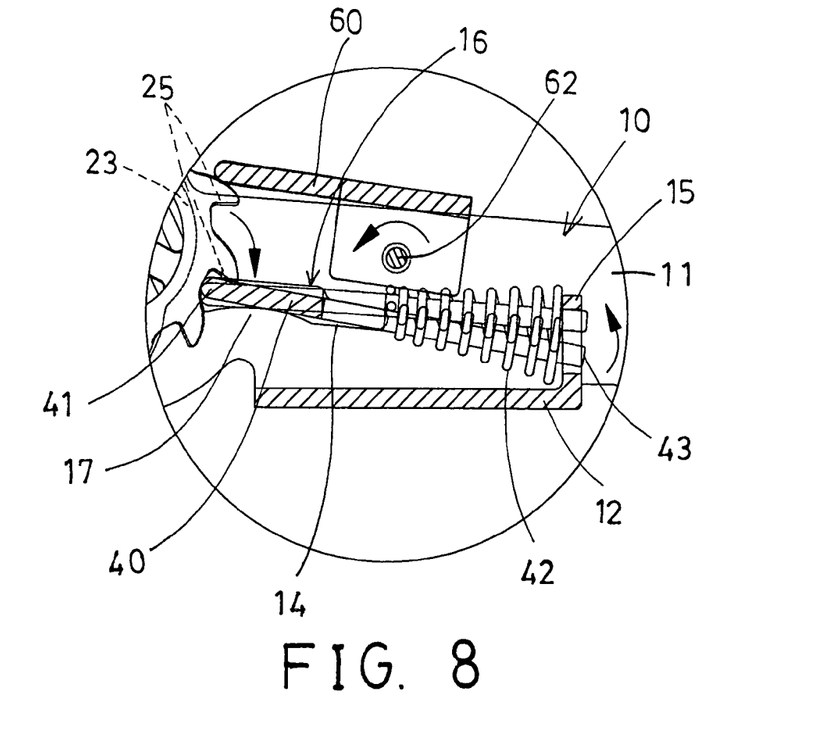
FIGS. 8, 9 are enlarged partial cross sectional views of the ratchet buckle device as shown in FIGS. 6, 7 respectively.
Figure 9:
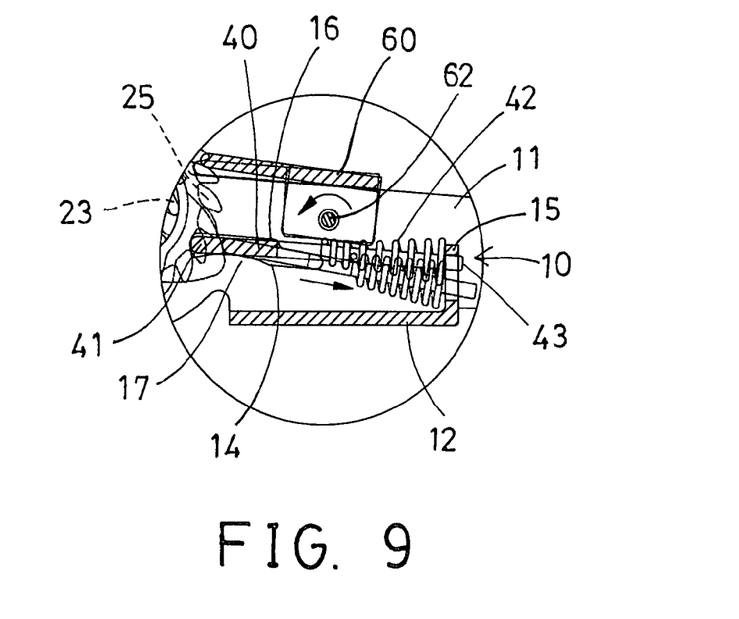
Figure 10:
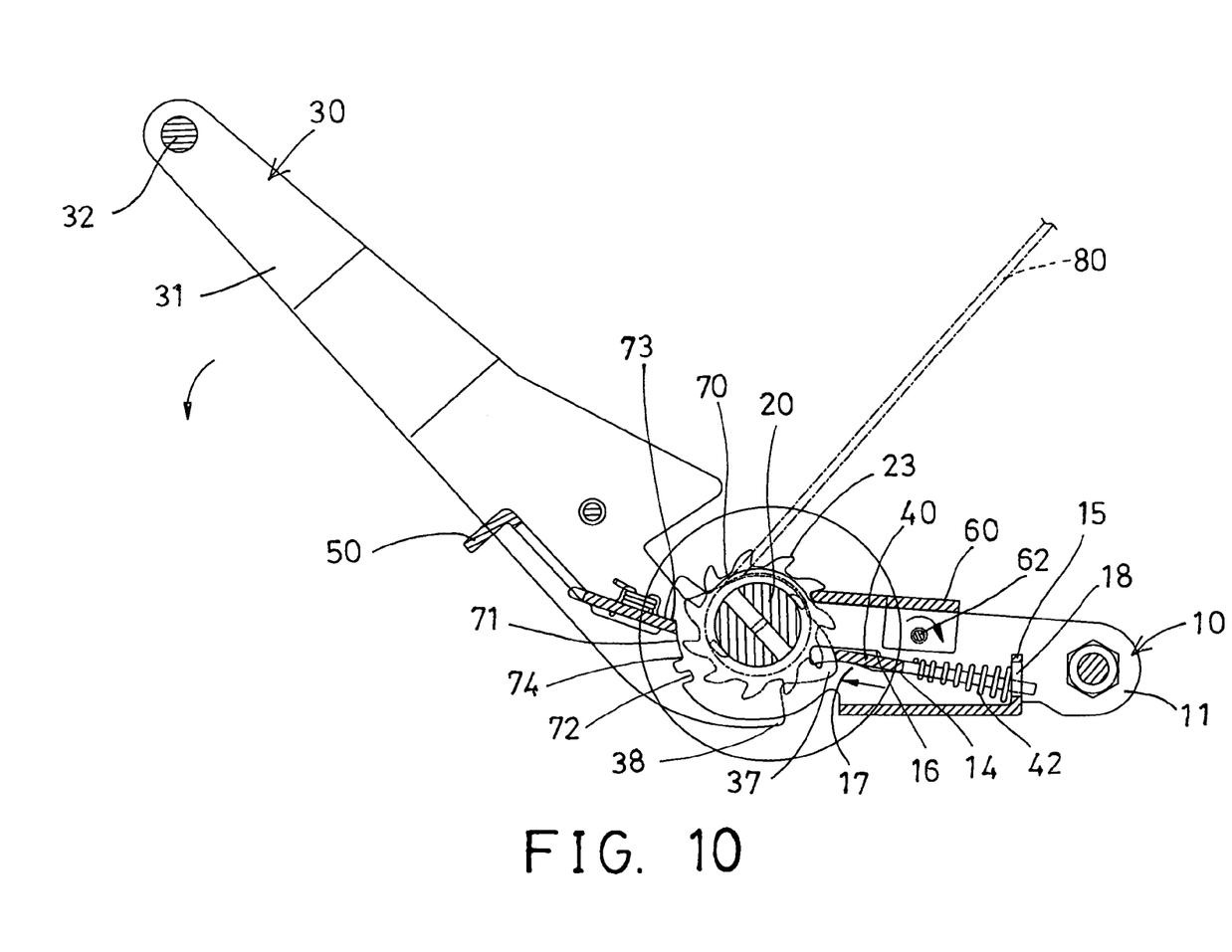
FIGS. 10, 11, 12 are cross sectional views similar to FIGS. 4-7 illustrating the operation of the ratchet buckle device.

It is to be noted that the limbs 41 of the stop 40 may also be slightly moved up and down relative to the side plates 11 (FIGS. 4-9) when the stop 40 is slightly tilted relative to the side plates 11, best shown in FIGS. 8 and 9, for allowing the contacting or engaging time of the limbs 41 of the stop 40 with the disc teeth 25 of the toothed discs 23 to be slightly reduced, or for allowing the limbs 41 of the stop 40 to be suitably or quickly engaged with the other disc teeth 25 of the toothed discs 23 during the strap winding operation, or when the toothed discs 23 are rotated counterclockwise relative to the side plates 11 of the base 10 (FIGS. 4-8), and for preventing the disc teeth 25 of the toothed discs 23 from slipping relative to the limbs 41 of the stop 40.

The operating arm 30 includes two legs 31 disposed or arranged parallel to each other, and one or more rods 32 straddled or secured between the legs 31 for reinforcing the legs 31 and for forming a stable or solid structure for the operating arm 30. The legs 31 each include a free end or a mounting portion 33 having an opening 34 formed therein for slidably receiving the end portions of the reel drum 20 respectively, and for allowing the legs 31 of the operating arm 30 to be rotatably attached or mounted or secured or engaged onto the reel drum 20. The operating arm 30 further includes a groove 36 formed in each of the legs 31 for slidably receiving a spring-biased catch device 50. The spring-biased catch device 50 includes one or more (such as two) pawls 51 for engaging with the disc teeth 25 of the toothed discs 23 and for allowing the toothed discs 23 and the reel drum 20 to be forced to rotate relative to the base 10 in the active direction by the operating arm 30.

One or more (such as two) spring members 52 are engaged between the legs 31 of the operating arm 30 and the catch device 50 for biasing or forcing the pawls 51 of the catch device 50 to engage with the disc teeth 25 of the toothed discs 23 and for allowing the toothed discs 23 and the reel drum 20 to be rotated relative to the base 10 by the operating arm 30 in the active direction, or for allowing the operating arm 30 to be rotated freely relative to the reel drum 20 in the reverse direction, but not to be rotated relative to the reel drum 20 in the active direction, and thus for allowing the belt or the strap 80 (FIGS. 3-7) to be wound onto the reel drum 20 step by step. The spring-biased catch device 50 may include one or more (such as two) projections or guides 53 extended therefrom for engaging with the legs 31 and for guiding the spring-biased catch device 50 to smoothly slide or move relative to the operating arm 30.

The ratchet buckle device 1 further includes a latch 60 having two flaps 61 extended downwardly therefrom and parallel to each other and engaged onto the inner portions or the outer portions of the side plates 11 of the base 10 respectively, or slightly spaced from the side plates 11 of the base 10, and parallel to the side plates 11 of the base 10, and pivotally or rotatably attached or mounted or secured or engaged onto the side plates 11 of the base 10 with a shaft 62 for allowing the latch 60 to be slightly tilted relative to the side plates 11, and the latch 60 includes one or more (such as two) fingers 63 for engaging with the disc teeth 25 of the toothed discs 23 and for guiding or limiting the toothed discs 23 and the reel drum 20 to rotate relative to the base 10 in the active direction only and for preventing the reel drum 20 from being rotated in the reverse direction relative to the base 10 and thus for allowing the reel drum 20 to rotate only in the active direction relative to the side plates 11 of the base 10.

It is also to be noted that the pivotal attachment of the latch 60 to the side plates 11 of the base 10 allows the latch 60 to be slightly tilted relative to the side plates 11, and thus for slightly increasing the contacting or engaging time of the fingers 63 of the latch 60 with the disc teeth 25 of the toothed discs 23. The fingers 63 of the latch 60 may also be slightly moved up and down relative to the side plates 11 when the latch 60 is slightly tilted relative to the side plates 11 for allowing the contacting or engaging time of the fingers 63 of the latch 60 with the disc teeth 25 of the toothed discs 23 to be slightly reduced, or for allowing the fingers 63 of the latch 60 to be suitably or quickly engaged with the other disc teeth 25 of the toothed discs 23 during the strap winding operation, or when the toothed discs 23 are rotated counterclockwise relative to the side plates 11 of the base 10, and for preventing the disc teeth 25 of the toothed discs 23 from slipping relative to the fingers 63 of the latch 60.

Figure 1:
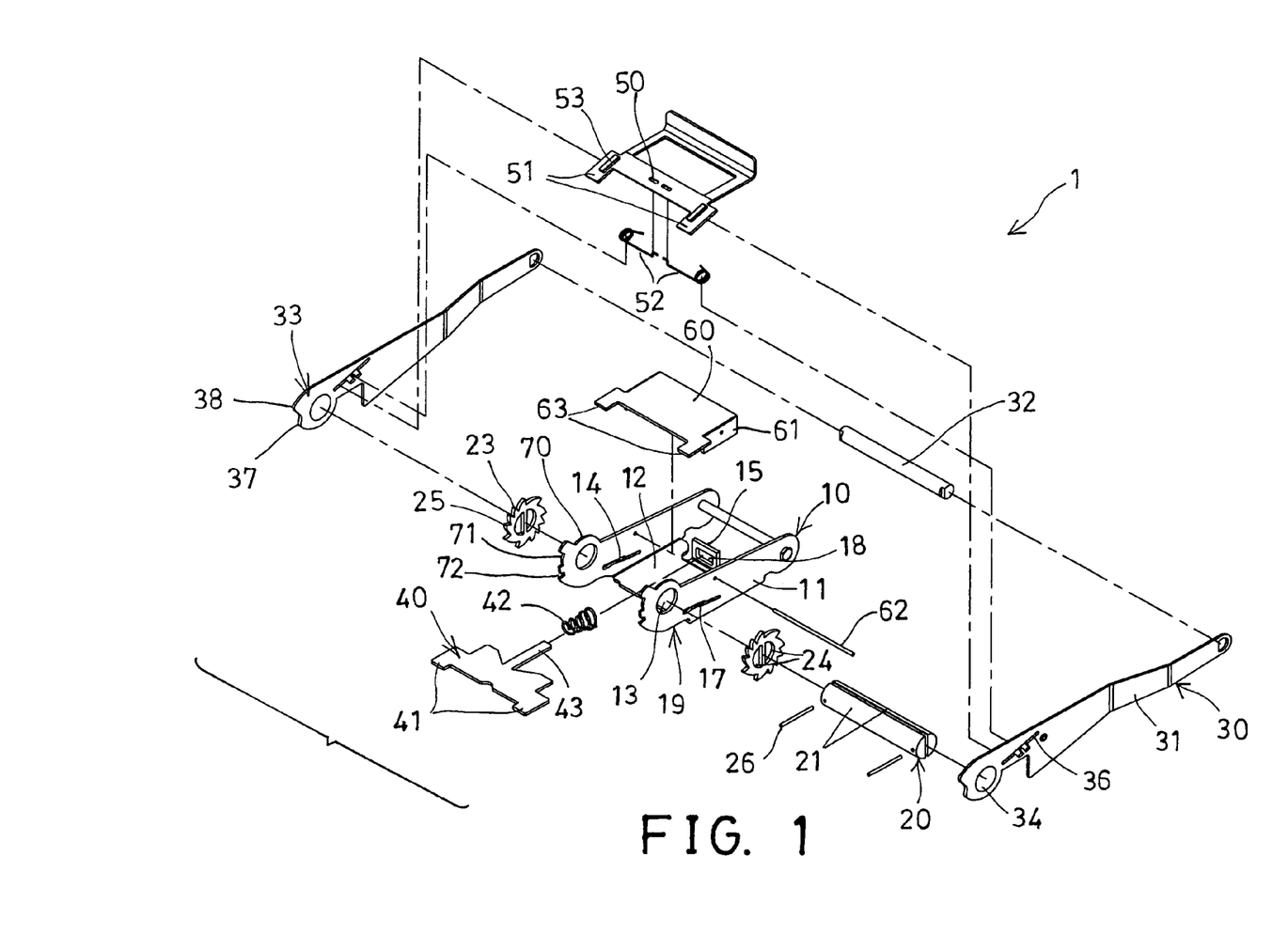
FIG. 1 is an exploded view illustrating an application of a ratchet buckle device in accordance with the present invention.
Figure 2:
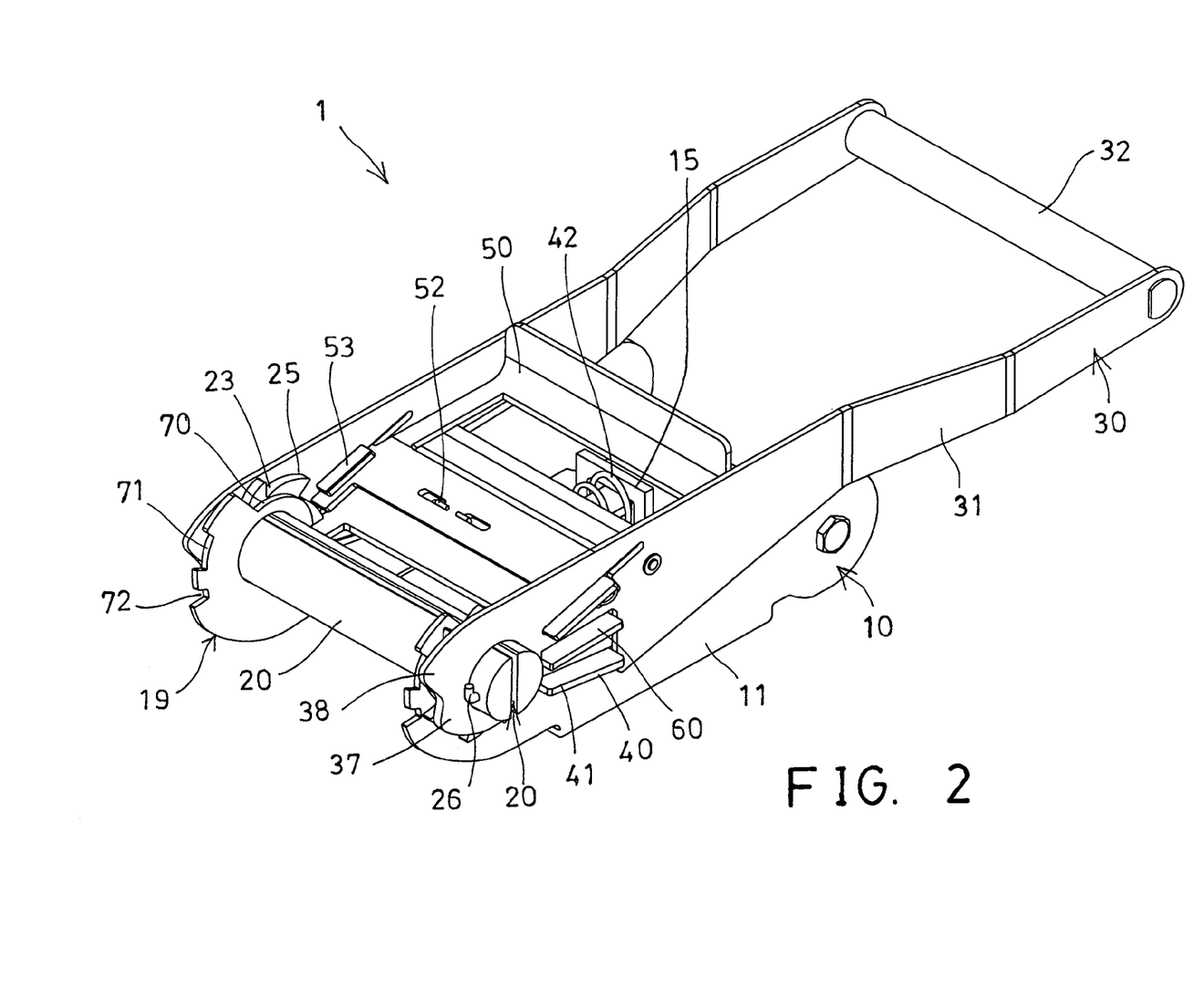
FIG. 2 is a perspective view of the ratchet buckle device.
Figure 3:
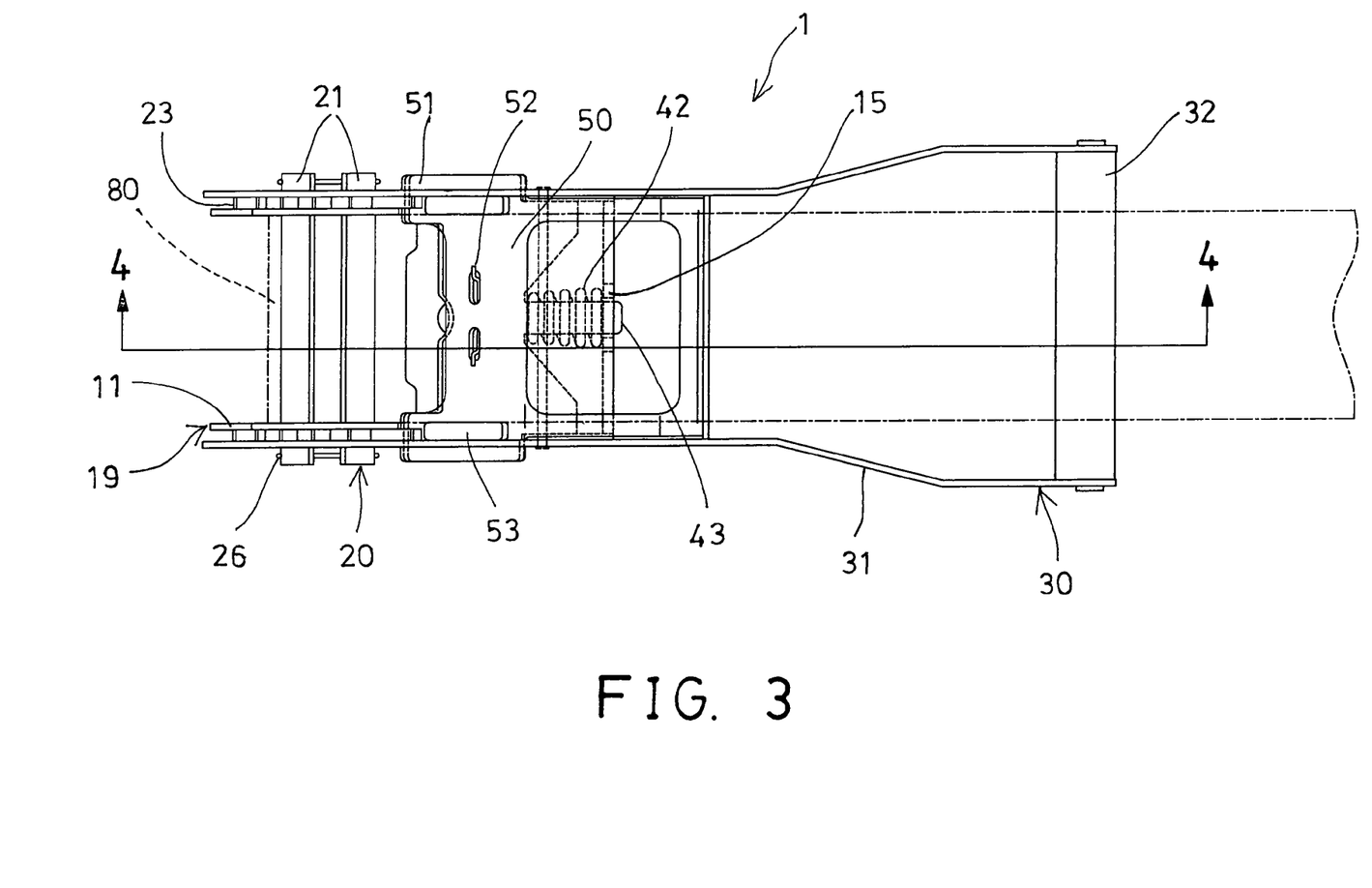
FIG. 3 is a top plan schematic view of the ratchet buckle device.
Figure 4:
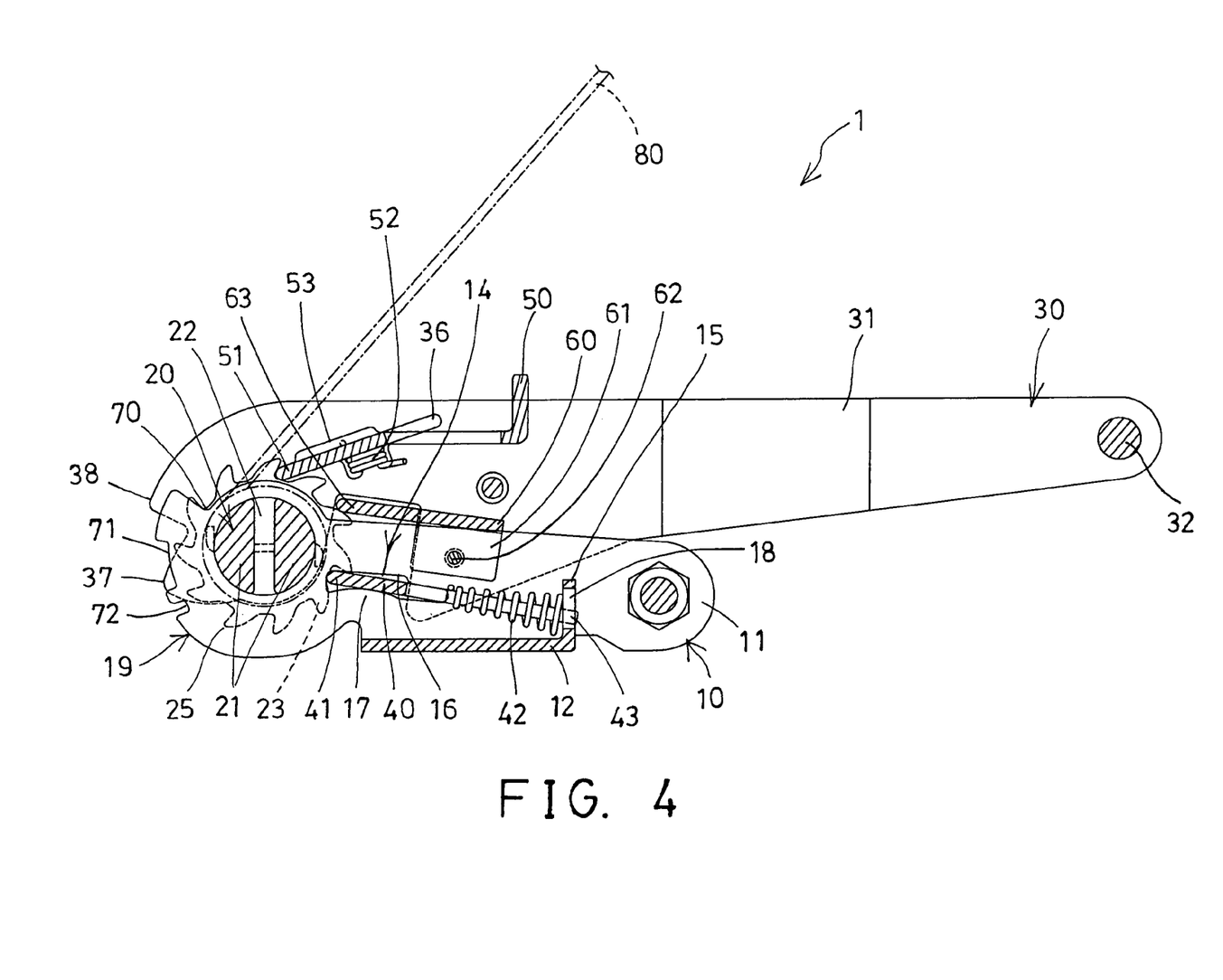
FIG. 4 is a cross sectional view of the ratchet buckle device taken along lines 4-4 of FIG. 3.
Figure 5:
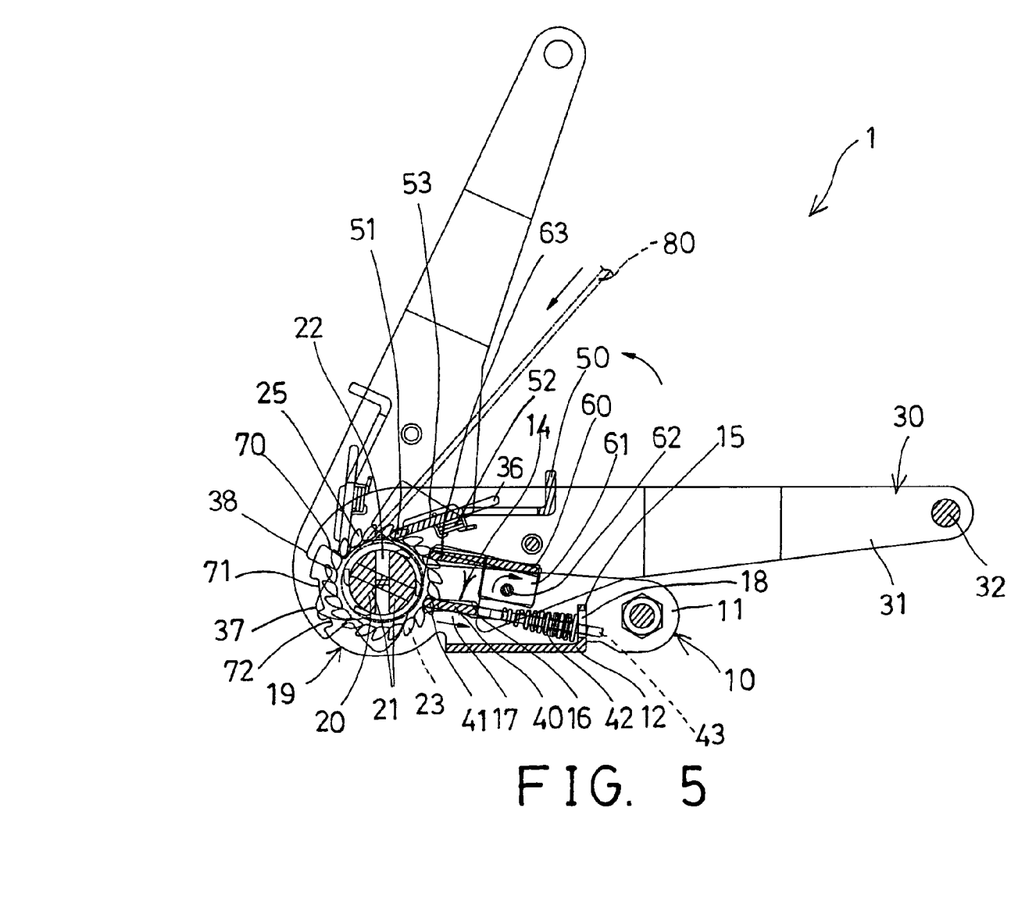
FIGS. 5, 6, 7 are cross sectional views similar to FIG. 4 illustrating the operation of the ratchet buckle device.
Figure 6:
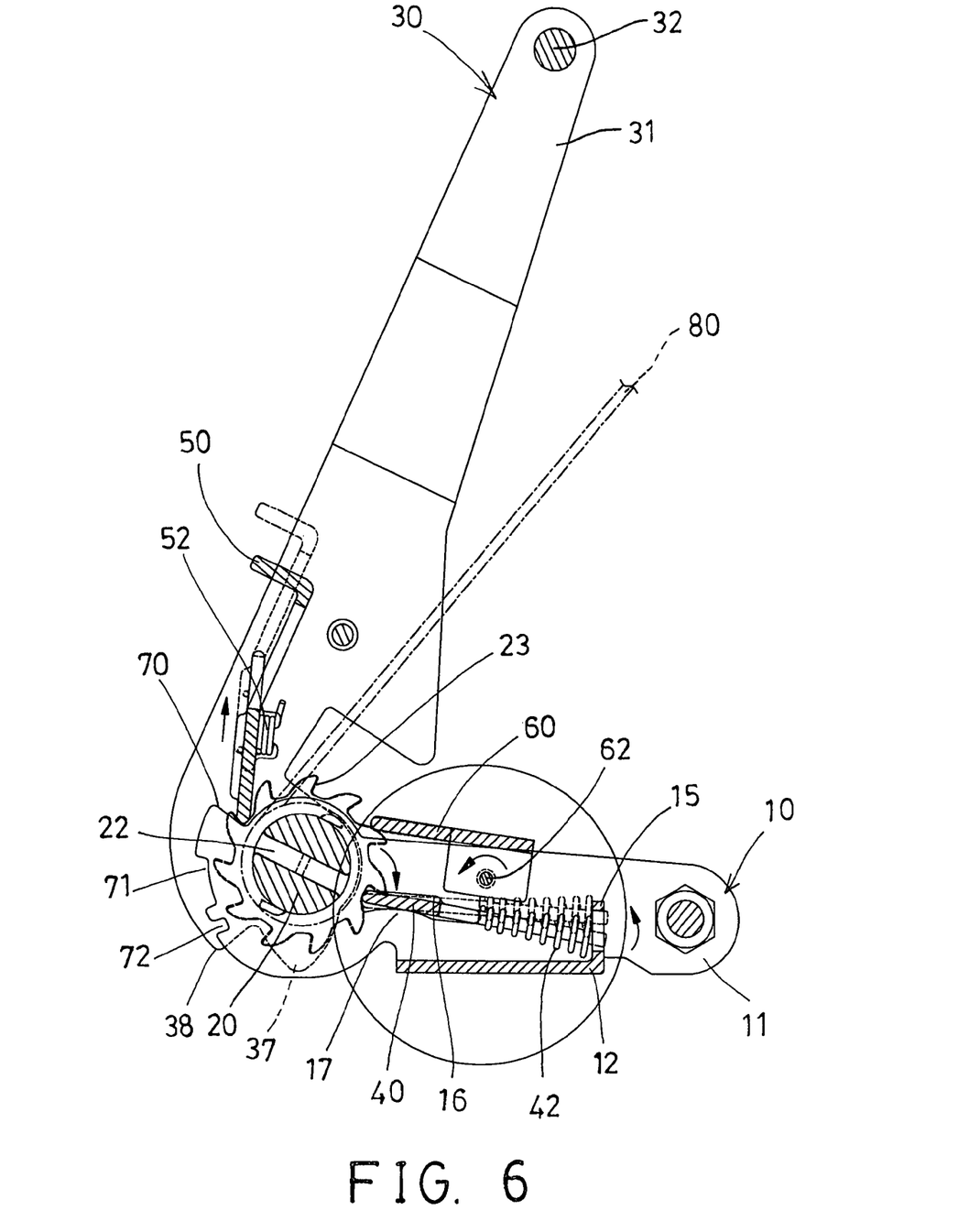

The side plates 11 of the base 10 each include an operating segment or portion 70 formed or provided in the operating end portion 19 thereof and having an outer diameter smaller than that of the disc teeth 25 of the toothed discs 23 for allowing the disc teeth 25 of the toothed discs 23 to be extended radially and outwardly relative to the operating segment or portion 70 of the side plates 11 of the base 10 and thus for allowing the pawls 51 of the catch device 50 to be engaged with the disc teeth 25 of the toothed discs 23 and thus for allowing the toothed discs 23 and the reel drum 20 to be forced to rotate relative to the base 10 in the active direction by the operating arm 30, and thus for allowing the belt or the strap 80 to be wound onto the reel drum 20 step by step by the operating arm 30 within the operating segment or portion 70 of the side plates 11 of the base 10, as shown in FIGS. 4-6 and as shown in solid lines in FIG. 7.

The side plates 11 of the base 10 each further include a release segment or portion 71 formed or provided in the operating end portion 19 thereof and located distal to the latch 60 and having an outer diameter greater than that of the disc teeth 25 of the toothed discs 23 for allowing the disc teeth 25 of the toothed discs 23 to be shielded within the release segment or portion 71 of the side plates 11 of the base 10 and thus for preventing the pawls 51 of the catch device 50 from being engaged with the disc teeth 25 of the toothed discs 23 and thus for preventing the toothed discs 23 and the reel drum 20 from being forced to rotate relative to the base 10 in the active direction by the operating arm 30, and thus for preventing the belt or the strap 80 from being further wound onto the reel drum 20 by the operating arm 30 within the release segment or portion 71 of the side plates 11 of the base 10, as shown in FIGS. 10-15.

The operating arm 30 includes a primary cam member 37 and a secondary cam member 38 formed or provided on the mounting portion 33 of each of the legs 31 of the operating arm 30 for selectively engaging with the stop 40 (FIGS. 10-11, 13-14) or the latch 60 (FIGS. 11-12, 14-15). For example, when the pawls 51 of the catch device 50 are engaged with the one end portion 73 of the release segment or portion 71 of the side plate 11 of the base 10 (FIGS. 10, 13) that is located closer to the operating segment or portion 70 of the side plates 11 of the base 10, the primary cam member 37 may be selectively engaged with the stop 40 for separating or disengaging the limbs 41 of the stop 40 from the disc teeth 25 of the toothed discs 23, may also be selectively engaged with the latch 60 for separating or disengaging the fingers 63 of the latch 60 from the disc teeth 25 of the toothed discs 23 (FIGS. 12, 15) when the pawls 51 of the catch device 50 are engaged with the other end portion 74 of the release segment or portion 71 of the side plate 11 that is located farther away from the operating segment or portion 70 of the side plates 11.

Figure 11:
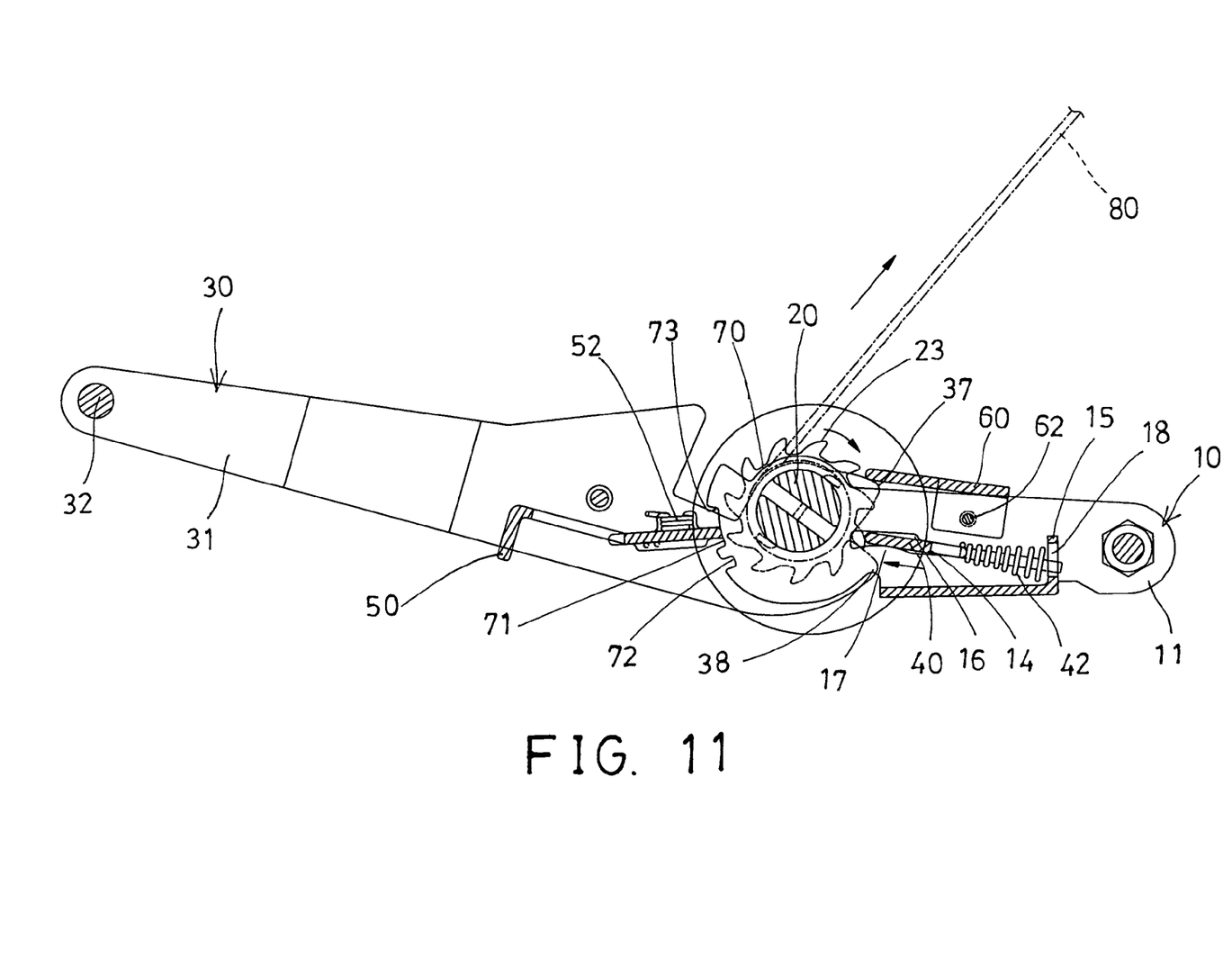
Figure 12:
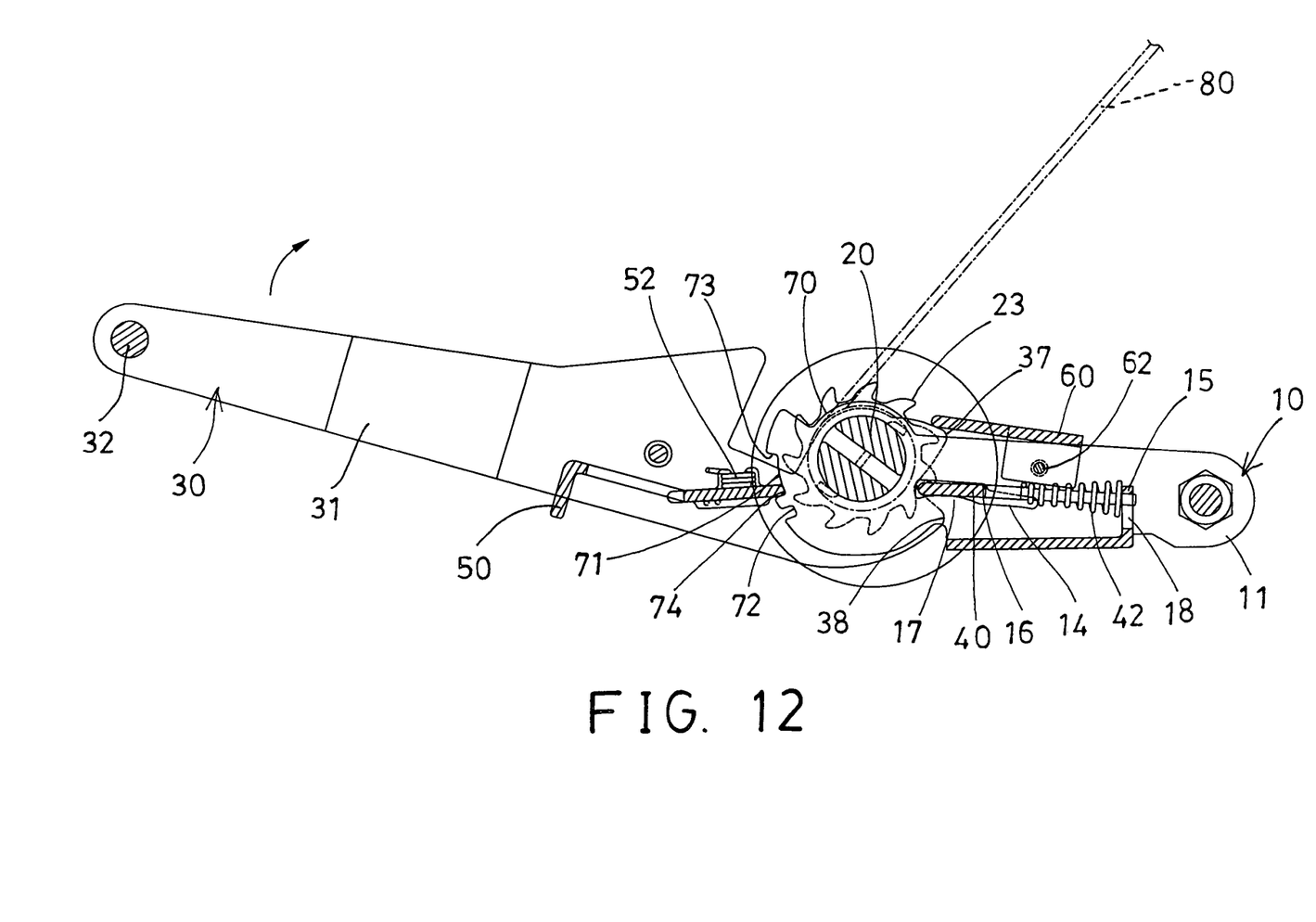
Figure 13:
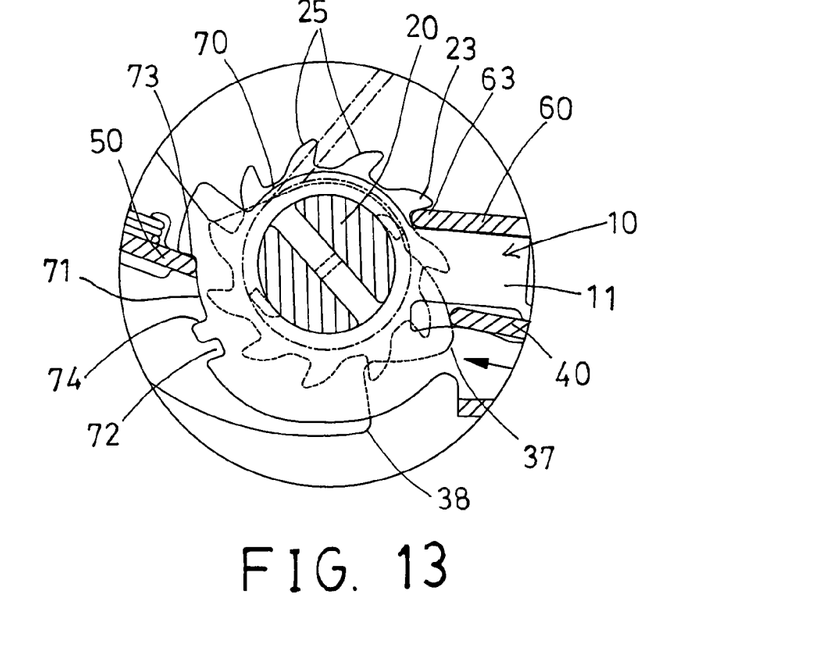
FIGS. 13, 14, 15 are enlarged partial cross sectional views of the ratchet buckle device as shown in FIGS. 10-12 respectively.
Figure 14:
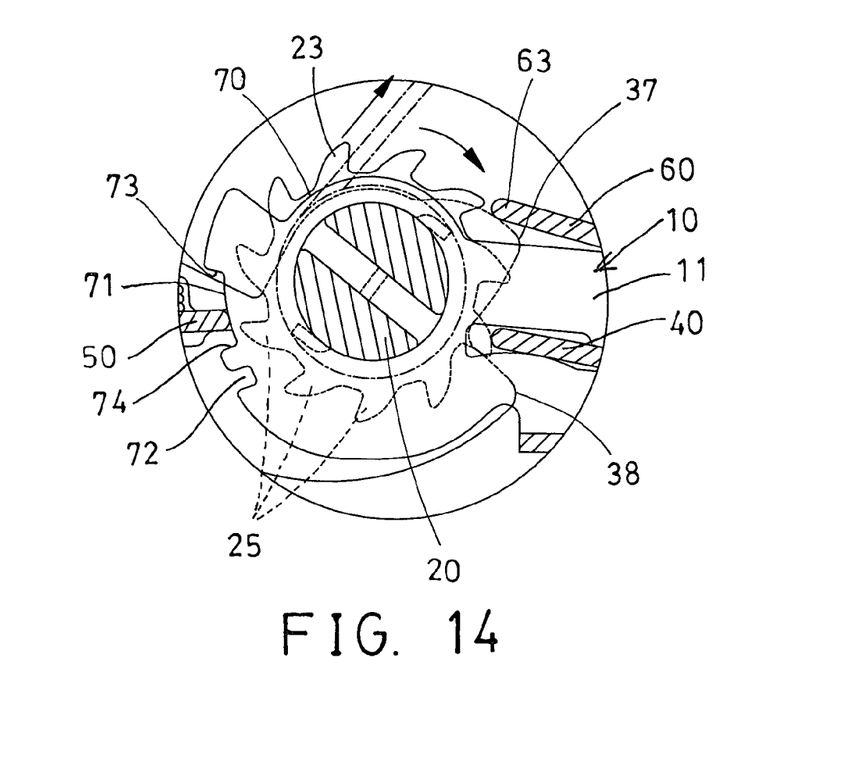
Figure 15:
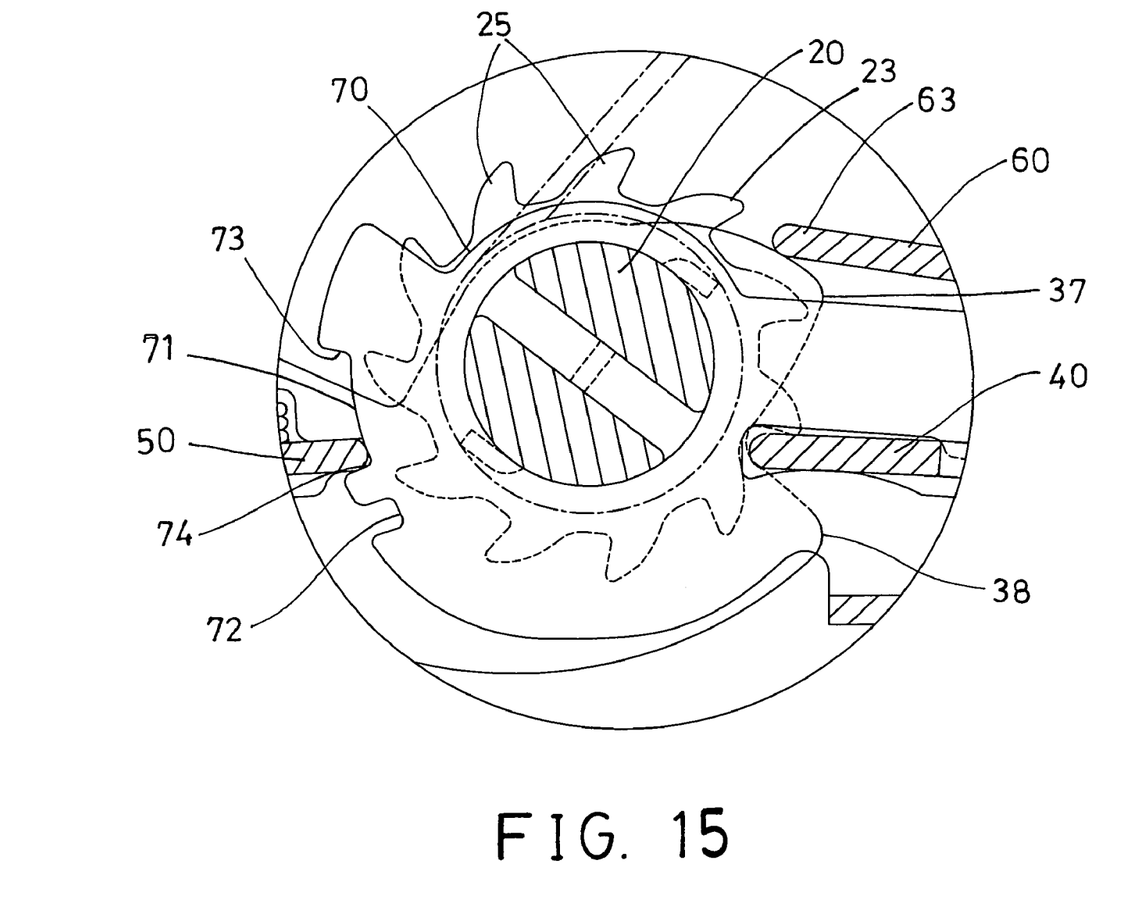

As shown in FIGS. 11, 14, when the pawls 51 of the catch device 50 are moved from the one end portion 73 of the release segment or portion 71 of the side plate 11 to the other end portion 74 of the release segment or portion 71 of the side plate 11, or quickly moved between the two end portions 73, 74 of the release segment or portion 71 of the side plate 11, both the stop 40 and the latch 60 will be caused or forced to be temporarily separated or disengaged from the disc teeth 25 of the toothed discs 23 simultaneously with the primary cam member 37 and the secondary cam member 38 of the operating arm 30, at this moment, the belt or the strap 80 that is tightly engaged on the reel drum 20 may force few of the disc teeth 25 of the toothed discs 23 to move over or to bypass the stop 40 and the latch 60, and may force the reel drum 20 to rotate in the reverse direction, i.e. clockwise relative to the base 10 in a small rotational angle and thus for allowing the belt or the strap 80 and the reel drum 20 to be slightly reversed for a small rotational angle.

Figure 16:
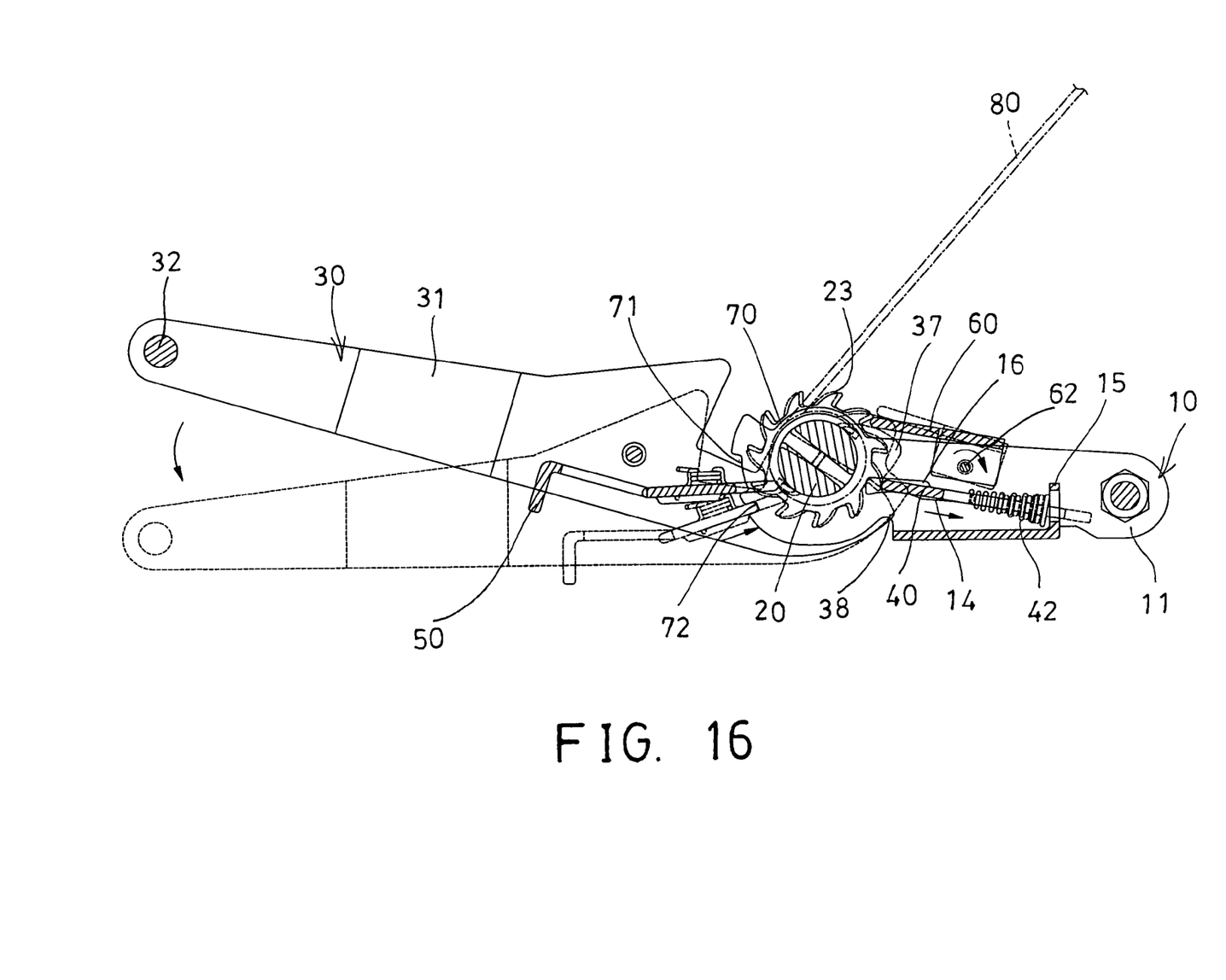
FIG. 16 is a cross sectional views similar to FIGS. 4-7 and 10-12 illustrating the operation of the ratchet buckle device.

The side plates 11 of the base 10 each further include an unlock segment or portion 72 formed or provided in the operating end portion 19 thereof and located distal to the latch 60 and also having an outer diameter greater than that of the disc teeth 25 of the toothed discs 23 for preventing the pawls 51 of the catch device 50 from being engaged with the disc teeth 25 of the toothed discs 23 and thus for preventing the toothed discs 23 and the reel drum 20 from being forced to rotate relative to the base 10 in the active direction by the operating arm 30, and thus for preventing the belt or the strap 80 from being further wound onto the reel drum 20 by the operating arm 30 within the unlock segment or portion 72 of the side plates 11 of the base 10, as shown in FIG. 16.

At this moment, the primary cam member 37 and the secondary cam member 38 of the operating arm 30 may be caused to engage with the stop 40 and the latch 60 simultaneously for separating or disengaging both the limbs 41 of the stop 40 and the fingers 63 of the latch 60 from the disc teeth 25 of the toothed discs 23, and for allowing the toothed discs 23 and the reel drum 20 to be rotated in the clockwise relative to the base 10 and thus for allowing the belt or the strap 80 to be unwound from the reel drum 20, and thus for allowing the belt or the strap 80 to be easily released or removed from the reel drum 20 when required, without moving or forcing or disengaging the stop 40 and the latch 60 from the disc teeth 25 of the toothed discs 23, such that the ratchet buckle device in accordance with the present invention may be easily operated by the users.

In operation, as shown in FIGS. 5-7, the limbs 41 of the stop 40 may be biased or forced to engage with the disc teeth 25 of the toothed discs 23 by the spring members 42 and the fingers 63 of the latch 60 may also be caused to engage with the disc teeth 25 of the toothed discs 23 for limiting and allowing the toothed discs 23 and the reel drum 20 to rotate relative to the base 10 in the reverse direction, i.e. counterclockwise relative to the base 10, and for preventing the reel drum 20 from being rotated in the active direction, i.e. clockwise relative to the base 10, or for preventing the belt or the strap 80 and the reel drum 20 from being rotated reversely, i.e. clockwise relative to the base 10. At this moment, the toothed discs 23 and the reel drum 20 may be forced to rotate relative to the base 10 in the active direction, i.e. counterclockwise relative to the base 10, by the operating arm 30 and the catch device 50 when the pawls 51 of the catch device 50 are selectively engaged within the operating segment or portion 70 of the side plates 11 of the base 10.

The operating arm 30 may be rotated clockwise relative to the base 10 when the toothed discs 23 and the reel drum 20 are anchored or positioned or latched by the limbs 41 of the stop 40 and the fingers 63 of the latch 60, and thus for allowing the toothed discs 23 and the reel drum 20 to be forced to rotate relative to the base 10 in the active direction, i.e. counterclockwise relative to the base 10, by the operating arm 30 and the catch device 50 step by step, in order to wind the belt or the strap 80 onto the reel drum 20 step by step. After the belt or the strap 80 has been tightly wound onto the reel drum 20 by the operating arm 30, or when the belt or the strap 80 is required to be slightly released, as shown in FIGS. 10-15, the catch device 50 may be engaged with the release segment or portion 71 of the side plates 11 of the base 10 and separated or disengaged from the disc teeth 25 of the toothed discs 23.

At this moment, both the stop 40 and the latch 60 may be caused or forced to be temporarily separated or disengaged from the disc teeth 25 of the toothed discs 23 simultaneously with the primary cam member 37 of the operating arm 30 when the pawls 51 of the catch device 50 are quickly moved between the two end portions 73, 74 of the release segment or portion 71 of the side plate 11, such that the belt or the strap 80 that is tightly engaged on the reel drum 20 may force few of the disc teeth 25 of the toothed discs 23 to move over or to bypass the stop 40 and the latch 60, and may force the reel drum 20 to rotate in the clockwise relative to the base 10 in a small rotational angle and thus for allowing the belt or the strap 80 and the reel drum 20 to be slightly reversed for a small rotational angle.

When it is required to release the belt or the strap 80, it is only required to further rotate the operating arm 30 relative to the base 10 and to engage the catch device 50 with the unlock segment or portion 72 of the side plates 11 of the base 10, and to engage the primary cam member 37 and the secondary cam member 38 of the operating arm 30 with the stop 40 and the latch 60 simultaneously in order to separate or to disengage both the limbs 41 of the stop 40 and the fingers 63 of the latch 60 from the disc teeth 25 of the toothed discs 23, and for allowing the toothed discs 23 and the reel drum 20 to be rotated in the clockwise relative to the base 10 and thus for allowing the belt or the strap 80 to be unwound from the reel drum 20, and thus for allowing the belt or the strap 80 to be easily released or removed from the reel drum 20 without moving or forcing or disengaging the stop 40 and the latch 60 from the disc teeth 25 of the toothed discs 23, such that the ratchet buckle device in accordance with the present invention may be easily operated by the users.

Accordingly, the ratchet buckle device in accordance with the present invention includes an improved structure for allowing the ratchet buckle device to be easily operated and for allowing the belt or strap to be easily released.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ratchet buckle device comprising:

a base including two side plates, said side plates each including an orifice formed in an operating end portion thereof, and each including a channel formed therein, and each including a protrusion extended into said channel of said side plate, and each including an operating segment and a release segment and an unlock segment formed in said operating end portion thereof, a reel drum rotatably engaged in said orifices of said side plates of said base for rotatably attaching said reel drum to said base, two toothed discs attached to said reel drum and rotated in concert with said reel drum, and each including a plurality of disc teeth provided thereon, a spring-biased stop slidably attached to said channels of said side plates of said base and including two limbs for detachably engaging with said disc teeth of said toothed discs, and for limiting said toothed discs and said reel drum to rotate relative to said base in an active direction and for preventing said reel drum from being rotated in a reverse direction relative to said base, said protrusions of said side plates being engageable with said stop for tilting said stop relative to said side plates of said base, and for allowing said limbs of said stop to be moved up and down relative to said side plates, a latch pivotally attached onto said side plates of said base with a shaft for allowing said latch to be tilted relative to said side plates, and said latch including two fingers for engaging with said disc teeth of said toothed discs and for limiting said toothed discs and said reel drum to rotate relative to said base in the active direction only and for preventing said reel drum from being rotated in the reverse direction relative to said base and for allowing said reel drum to rotate in the active direction relative to said side plates of said base, an operating arm including two legs rotatably attached to said reel drum, and including an opening formed in a mounting portion of each of said legs for receiving said reel drum and for attaching said legs of said operating arm to said reel drum, and said legs each including a primary cam member and a secondary cam member provided on said mounting portion of said leg of said operating arm for selectively engaging with said stop and said latch and for selectively disengaging said limbs of said stop from said disc teeth of said toothed discs and for selectively disengaging said fingers of said latch from said disc teeth of said toothed discs, and a spring-biased catch device slidably attached to said operating arm and engaged with said disc teeth of said toothed discs, for allowing said toothed discs and said reel drum to be rotated relative to said base by said operating arm in the active direction and for preventing said reel drum from being rotated in the reverse direction relative to said base by said operating arm, and said operating segments of said side plates each including an outer diameter smaller than that of said disc teeth of said toothed discs for allowing said disc teeth of said toothed discs to be extended radially and outwardly relative to said operating segment of said side plates of said base and for allowing said pawls of said catch device to be engaged with said disc teeth of said toothed discs, and said release segments of said side plates each including an outer diameter greater than that of said disc teeth of said toothed discs for allowing said disc teeth of said toothed discs to be shielded within said release segment of said side plates of said base and for preventing said pawls of said catch device from being engaged with said disc teeth of said toothed discs, and said unlock segments of said side plates each including an outer diameter greater than that of said disc teeth of said toothed discs for preventing said pawls of said catch device from being engaged with said disc teeth of said toothed discs, and said primary cam members of said legs of said operating arm being engageable with either of said stop or said latch for selectively disengaging said stop or said latch from said disc teeth of said toothed discs when said catch device is engaged with said release segment of said side plates of said base, and said primary cam members and said secondary cam members of said legs of said operating arm being engaged with said stop and said latch for disengaging said stop and said latch from said disc teeth of said toothed discs when said catch device is engaged with said unlock segment of said side plates of said base.

2. The ratchet buckle device as claimed in claim 1, wherein said latch includes two flaps extended downwardly therefrom and pivotally attached onto said side plates of said base with said shaft.

3. The ratchet buckle device as claimed in claim 1, wherein said base includes a base plate provided between said side plates, and a peg extended from said base plate and having a space formed in said peg for slidably receiving a tail of said stop and for allowing said stop to be tilted relative to said side plates.

4. The ratchet buckle device as claimed in claim 1, wherein said base includes an opening formed in each of said side plates and communicating with said channel of each of said side plates for allowing said stop to be tilted relative to said side plates.

* * * * *